United States Patent
DeLand et al.

(10) Patent No.: US 11,016,996 B2
(45) Date of Patent: *May 25, 2021

(54) DYNAMIC CLUSTERING FOR STREAMING DATA

(71) Applicant: Groupon, Inc., Chicago, IL (US)

(72) Inventors: Matthew DeLand, San Francisco, CA (US); Chander J. Iyer, Troy, NY (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,267

(22) Filed: May 21, 2019

(65) Prior Publication Data

US 2020/0050614 A1    Feb. 13, 2020

Related U.S. Application Data

(63) Continuation of application No. 15/815,299, filed on Nov. 16, 2017, now Pat. No. 10,339,163, which is a continuation of application No. 15/259,630, filed on Sep. 8, 2016, now Pat. No. 9,852,212, which is a continuation of application No. 14/038,661, filed on Sep. 26, 2013, now Pat. No. 9,465,857.

(51) Int. Cl.
*G06F 16/28*    (2019.01)

(52) U.S. Cl.
CPC .......... *G06F 16/285* (2019.01); *G06F 16/283* (2019.01)

(58) Field of Classification Search
CPC ............................. G06F 16/285; G06F 16/283
See application file for complete search history.

(56) References Cited

U.S. PATENT DOCUMENTS

| | | | |
|---|---|---|---|
| 6,581,058 B1 | 6/2003 | Fayyad et al. | |
| 9,465,857 B1 | 10/2016 | DeLand et al. | |
| 9,852,212 B2 | 12/2017 | DeLand et al. | |
| 2003/0154186 A1* | 8/2003 | Goodwin | G06N 5/00 |
| 2005/0080656 A1* | 4/2005 | Crow | G06Q 10/10 |
| | | | 705/7.14 |
| 2007/0271265 A1* | 11/2007 | Acharya | G06F 16/285 |
| 2009/0037440 A1* | 2/2009 | Will | G06K 9/6219 |
| 2009/0106304 A1* | 4/2009 | Song | G06K 9/6272 |
| 2011/0087668 A1* | 4/2011 | Thomas | G06F 16/355 |
| | | | 707/738 |
| 2013/0262465 A1* | 10/2013 | Galle | G06F 16/00 |
| | | | 707/737 |
| 2017/0124178 A1 | 5/2017 | DeLand et al. | |

* cited by examiner

*Primary Examiner* — Cam Y T Truong
(74) *Attorney, Agent, or Firm* — Alston & Bird LLP (57) ABSTRACT

In general, embodiments of the present invention provide systems, methods and computer readable media for modeling multi-dimensional, dynamically evolving data using dynamic clustering. In one aspect, a method includes receiving a core group of clusters of objects, each object being represented by a corresponding instance of a multi-dimensional feature vector including a dimension k; receiving a stream of data points representing a group of objects, each data point respectively representing an instance of dimension k describing a feature of an object within the group of objects; and, for each data point, adding an object described by the data point to a first cluster of objects within the core group of clusters; updating properties of the first cluster of objects in response to adding the object; and determining whether to update the core group of clusters using the updated properties of the first cluster of objects.

22 Claims, 6 Drawing Sheets

DYNAMIC CLUSTERING FOR STREAMING DATA

CROSS REFERENCE TO RELATED APPLICATIONS

This application is a continuation of U.S. application Ser. No. 15/815,299, titled "DYNAMIC CLUSTERING FOR STREAMING DATA," filed Nov. 16, 2017, which is a continuation of U.S. application Ser. No. 15/259,630, titled "DYNAMIC CLUSTERING FOR STREAMING DATA," filed Sep. 8, 2016, now U.S. Pat. No. 9,852,212, which is a continuation of U.S. application Ser. No. 14/038,661, titled "DYNAMIC CLUSTERING FOR STREAMING DATA," filed Sep. 26, 2013, now U.S. Pat. No. 9,465,857, the contents of which are incorporated herein by reference in their entirety.

FIELD

Embodiments of the invention relate, generally, to modeling multi-dimensional, dynamically evolving data using dynamic clustering.

BACKGROUND

Current methods for modeling multi-dimensional, dynamically evolving data exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for dynamically updating a model core group of clusters in response to receiving streaming data, so that an improved set of clusters for a particular dimension can be obtained for data representing any particular time window.

In general, one aspect of the subject matter described in this specification can be embodied in systems, methods, and computer program products that include the actions of receiving a core group of clusters of objects, each object being represented by a corresponding instance of a multi-dimensional feature vector including a dimension k; receiving a stream of data points representing a group of objects, each data point respectively representing an instance of dimension k describing a feature of an object within the group of objects; and, for each data point, adding an object described by the data point to a first cluster of objects within the core group of clusters in response to classifying the object as belonging to the first cluster of objects; updating properties of the first cluster of objects in response to adding the object, the updating including calculating a first standard deviation of clustering dimension k for the first cluster of objects; and determining whether to update the core group of clusters using the updated properties of the first cluster of objects. In embodiments, the core group of clusters is clustered based on dimension k; and generating the core group of clusters is based in part on at least one tuning parameter representing clustering density.

These and other embodiments can optionally include one or more of the following features. Determining whether to update the core group of clusters includes comparing the first standard deviation of clustering dimension k to a minimum standard deviation of clustering dimension k; and, in an instance in which the first standard deviation of clustering dimension k is greater than the minimum standard deviation of clustering dimension k, splitting the first cluster of objects by dividing the first cluster of objects into a second cluster of objects and a third cluster of objects. Determining whether to update the core group of clusters may further include, in an instance in which the first standard deviation of clustering dimension k is less than or equal to the minimum standard deviation of clustering dimension k, selecting a fourth cluster of objects that is closest to the first cluster of objects within the core group of clusters of objects; calculating a combined standard deviation of clustering dimension k for the combined first cluster of objects and fourth cluster of objects; and, in an instance in which the combined standard deviation of clustering dimension k is less than or equal to the minimum standard deviation of clustering dimension k, generating a fifth cluster of objects within the core group of clusters by merging the first cluster of objects and the fourth cluster of objects.

Determining whether to update the core group of clusters may further include updating the core group of clusters based on the tuning parameter representing clustering density in response to receiving a request for core cluster information. The tuning parameter may be a minimum number of data points to form a core cluster. The tuning parameter may be a minimum number of neighborhood points for merging into core clusters. Calculating the first standard deviation of clustering dimension k may include using a cluster purity measure. The stream of data points may be collected during a particular time window. The core group of clusters of objects may represent a group of objects belonging to a taxonomy hierarchy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

In an increasingly data-driven world where data comes in different forms (e.g., structured, unstructured), is received from various sources (e.g., consumer product and service reviews and social network communications), is associated with specific geographical locations, and is representative of different types of services (e.g., travel, healthcare, and food & drink, etc.), one is presented with many significant challenges when attempting to leverage such heterogeneous and multi-dimensional data to achieve and maintain high data quality. These challenges are compounded when the leveraged data is received as streaming data that evolves continuously over time.

Traditional machine learning approaches for modeling multi-dimensional, dynamically evolving data are inefficient and expensive operations that do not efficiently scale, because these approaches require responding to each change in the data by developing a new model. Typically, operations involved in developing a new model include constructing labeled data instances representing each change in the data, creating new training data sets that include the labeled instances, and adapting a new model based on the new training data sets.

Cluster analysis is a statistical analysis technique for modeling data. In cluster analysis, each of a set of objects is described using feature data, and the set of objects are grouped (i.e., clustered) so that, based on one or more aspects of the feature data, objects within a cluster are more similar to each other in terms of the feature data than they are to objects outside of the cluster. There are a variety of clustering algorithms that may be used to model data by creating a set of clusters based on aspects of the data. One type of clustering algorithm is a k-means algorithm, in which an object is assigned to a cluster determined to be nearest to the object based on comparing the Euclidean distances along one or more data dimensions between the data representing the object and the data representing the cluster. There are a variety of implementations of the k-means algorithm for creating a set of clusters from a data cloud. One example implementation is a bisection k-means clustering algorithm, in which a random binary tree of clusters is formed from a data cloud by iteratively splitting each parent node into two child nodes using k-means clustering.

The sizes, shapes, and total number of clusters that may be created from a particular data cloud using a clustering algorithm are dependent on the distribution of data within the data cloud. Thus, traditional clustering techniques do not adapt to dynamically evolving, multi-dimensional data because the distribution continuously varies as the data evolves and the rate and type of data changes may differ along different dimensions. Additionally, a traditional cluster data model developed for a particular data cloud cannot be used for data mining to discover clusters based on new data collected from a data stream within different timeframes and/or discover new clusters based on different data dimensions from the dimensions used for the cluster model.

As such, and according to some example embodiments, the systems and methods described herein are therefore configured to dynamically update a model core group of clusters in response to receiving streaming data, so that an improved set of clusters for a particular dimension can be obtained for data representing any particular time window.

Figure 1:
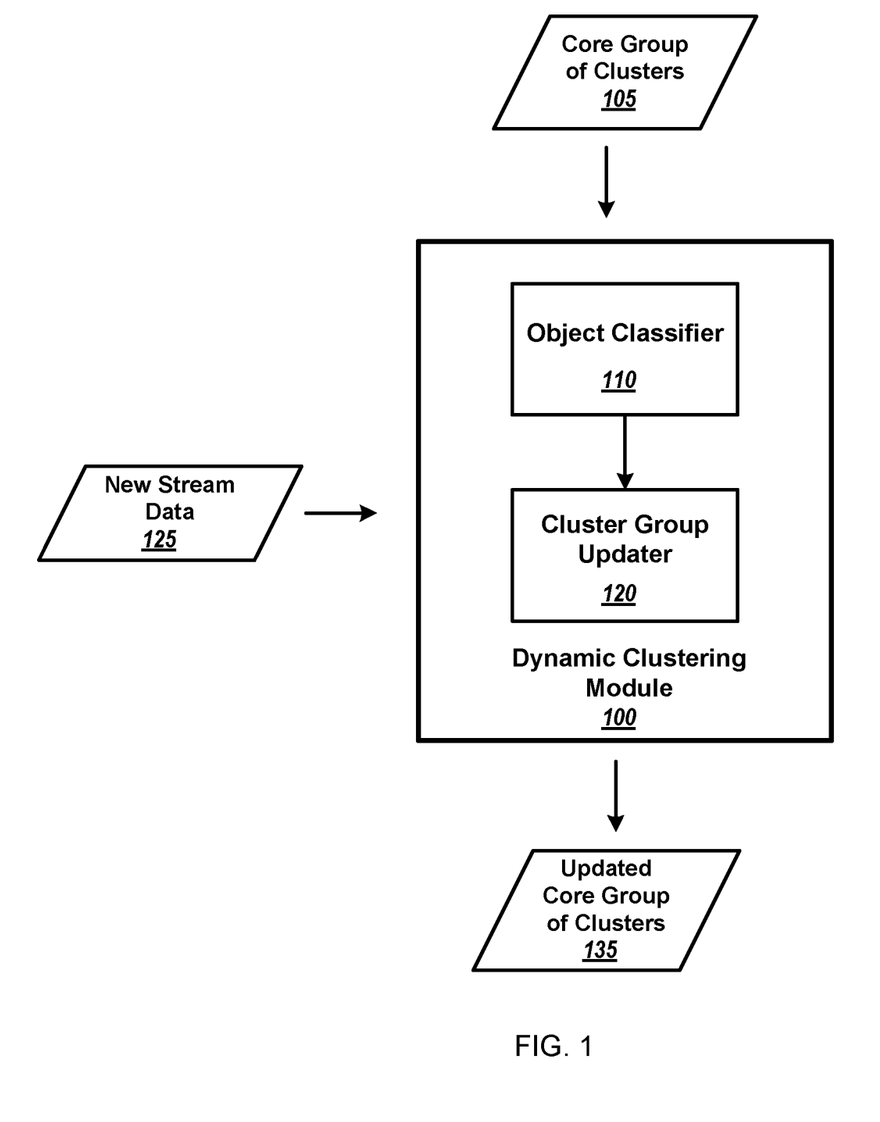
FIG. 1 illustrates an example embodiment of a dynamic clustering module in accordance with some embodiments discussed herein.

FIG. 1 illustrates an example embodiment of a dynamic clustering module 100 that can be configured to receive a model core group of clusters 105, and then, in response to receiving new stream data 125, generate an updated model core group of clusters 135 based on integrating the received new data into the model.

In some embodiments, a model core group of clusters 105 is generated from a set of data collected from various sources. In some embodiments, the model core group of clusters 105 may represent a group of objects described by the collected data, where each object is represented by an n-dimensional feature vector. For example, in embodiments, the group of objects may be a group of businesses that have published attribute information (e.g., contact information, business address information, product and service listings, product and service descriptions, etc.) online (e.g., published websites and/or advertisements on the Internet).

In some embodiments, the model core group of clusters 105 initially may be generated using a machine learning technique (e.g., k-means clustering as previously described). Each dimension can have its own potential set of clusters in the model core group of clusters 105 depending upon the clustering approach undertaken across that dimension.

In some embodiments, the data quality of the collected data may be improved by further quality analysis (e.g., labeling the data using crowd sourcing), and the model core group of clusters 105 may be updated based on a new set of training data that include the higher quality data.

In embodiments, dynamic clustering module 100 receives a new data stream 125 representing the objects in the model core group of clusters 105. In some embodiments, the new data stream 125 represents data collected during a particular time window (e.g., a day, a week, a month, or other selected time window). Additionally and/or alternatively, in some embodiments, the new data stream 125 represents a particular number of collected data points (e.g., 10,000 points).

If each object $O^i$ in the model core group of clusters 105 is represented by an n-dimensional vector $O^i=(O^i_1, O^i_2, \ldots, O^i_n)$, a multi-dimensional data stream S representing the objects can be represented as $S=\{O^1, O^2, \ldots, O^h, \ldots\}$. If $X_k^j$ represents the set of clusters for the $k^{th}$ dimension at any time window $T_j$, a cluster feature vector $C_k$ is defined so that for every cluster $C_k \in X_k$ for any time window:

$$C_k = \begin{cases} \delta_k & : \text{number of cluster objects} \\ \mu_k & : \text{cluster centroid computed as the average of cluster objects} \\ SS_k & : \text{Square sum of cluster objects} \\ \sigma_k & : \text{Standard deviation of cluster objects} \end{cases}$$

In embodiments, dynamic clustering module 100 analyzes the new data points across each dimension and determines, based on the analysis, whether the model core group of clusters 105 should be updated after the new data is integrated into the model. In embodiments, dynamic clustering module 100 generates an updated model core group of clusters 135 in response to determining that the model core group of clusters 105 should be updated.

Since $X_k$ represents a model of a data cloud generated from collected data, there is an absence of a global set of truth clusters that could be used to evaluate the accuracy of the clusters that were generated. In some embodiments, one or more tuning parameters that reflect cluster density may be used to ensure the maximum overall standard deviation over all the core clusters. In some embodiments, examples of tuning parameters that may be used include 3, the minimum number of neighborhood points for merging into core clusters, and $C_{min}$, the minimum number of points to form a core cluster. Additionally and/or alternatively, in some embodiments, using supplemental information (e.g., Country Codes for clusters based on geographical features) and/or a cluster purity measure may be used to obtain a standard deviation that maximizes the overall purity of $X_k$.

In some embodiments, in response to receiving a request for core cluster information, dynamic clustering module 100 generates an updated model core group of clusters $X^*_k$ by merging the clusters in $X_k$ using one or more tuning parameters and/or supplemental information and/or a cluster purity measure. In some embodiments, a cluster purity measure may include the distance between two clusters that may be merged, the density (measured as the average distance of each point within a cluster to the center of the cluster) of the two clusters individually and the density of the merged clusters, the average distance between all points in the cluster, and the standard deviation of points within the clusters.

Figure 2:
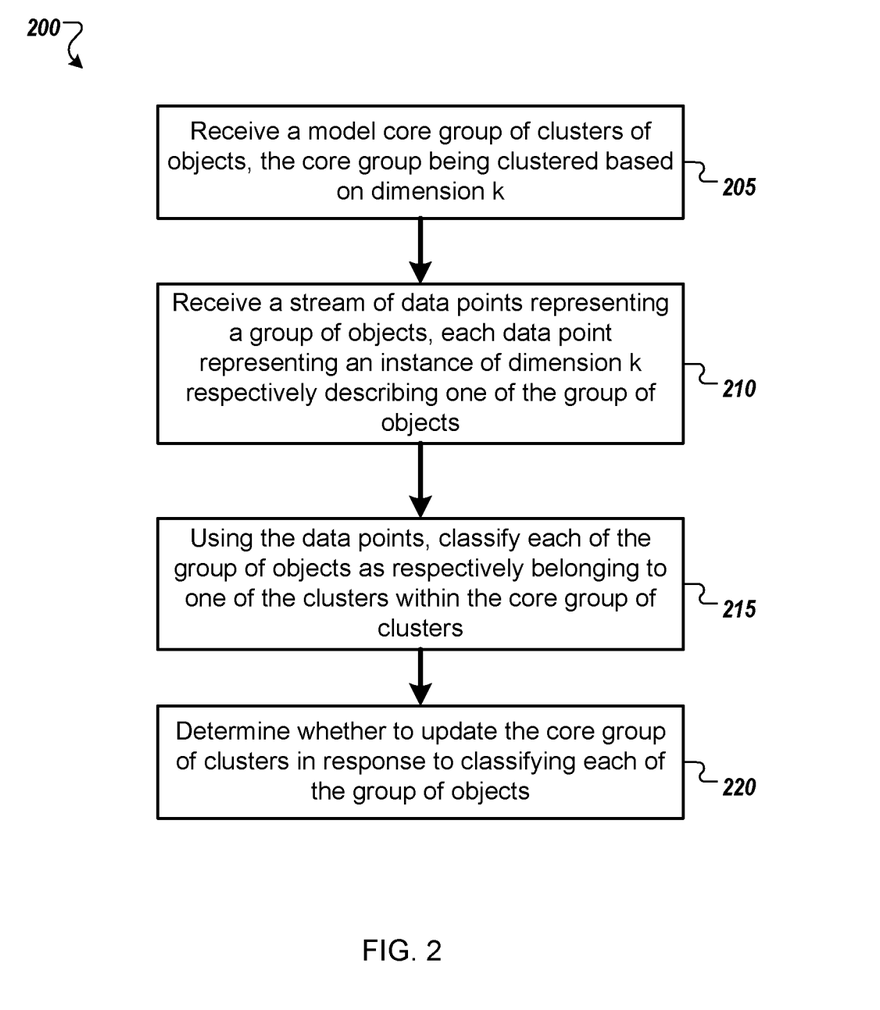
FIG. 2 is a flow diagram of an example method for dynamically updating a model core group of clusters along a single dimension k in accordance with some embodiments discussed herein.

FIG. 2 is a flow diagram of an example method 200 for dynamically updating a model core group of clusters along a single dimension k. For convenience, the method 200 will be described with respect to a system that includes one or more computing devices and performs the method 200. Specifically, the method 200 will be described with respect to processing of new stream data 125 by dynamic clustering module 100.

In embodiments, the system receives 205 $X_k$, a model core group of clusters 105 of objects based on a clustering dimension k. For example, in embodiments, clustering dimension k may represent a geographical feature of an object represented by latitude and longitude data. In embodiments, the system receives 210 a new data stream $S_k$ representing the objects in $X_k$, where the n-dimensional vector representing each object $O^i$ includes the $k^{th}$ dimension.

In embodiments, the system classifies 215 each of the objects represented in the new data stream 125 as respectively belonging to one of the clusters within $X_k$. In some embodiments, an object is classified by determining, based on a k-means algorithm, $C_k$, the nearest cluster to the object in the $k^{th}$ dimension. In embodiments, classifying an object includes adding that object to the cluster $C_k$.

In embodiments, the system determines 220 whether to update $X_k$ in response to integrating each of the objects into its respective nearest cluster. Implementation of this determination will be discussed in detail below with respect to FIG. 3 and FIG. 4.

Figure 3:
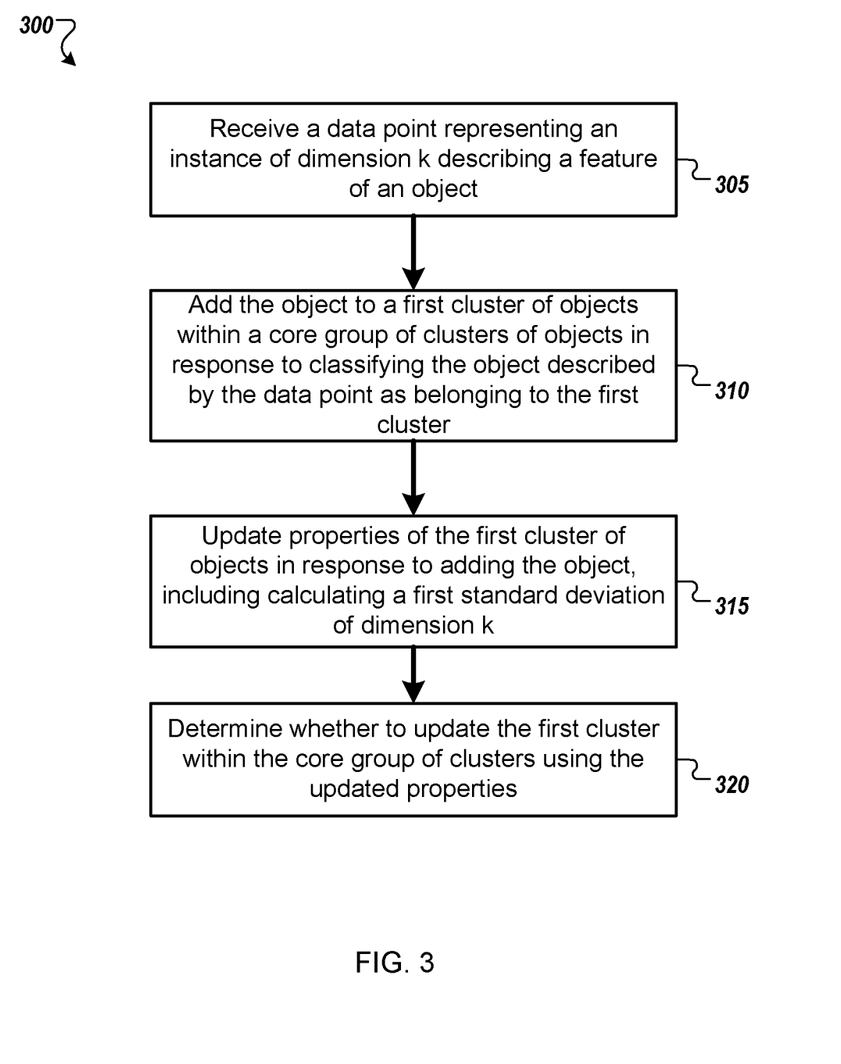
FIG. 3 is a flow diagram of an example method for dynamically updating a cluster along a single dimension k in accordance with some embodiments discussed herein.

FIG. 3 is a flow diagram of an example method 300 for dynamically updating a cluster along a single dimension k. For convenience, the method 300 will be described with respect to a system that includes one or more computing devices and performs the method 300. Specifically, the method 300 will be described with respect to implementation of steps 215 and 220 of method 200 by object classifier 110 of dynamic clustering module 100.

In embodiments, the system receives 305 a data point from a new data stream $S_k$ representing $O^i_k$, an instance of clustering dimension k describing a feature of an object being described in new data stream S. For example, in embodiments, the data point may be latitude and longitude representing a geographical feature included in an n-dimensional feature vector describing the object.

In embodiments, the system adds 310 the object to the closest cluster $C_k \in S_k$ for $O^i_k$, and, in response, updates 315 the properties of cluster $C_k$. In embodiments, updating the properties includes calculating $\sigma_k$, the standard deviation of the objects in cluster $C_k$.

In embodiments, the system determines 320 whether to update cluster $C_k$ using its updated properties. In some embodiments, updating cluster $C_k$ may include splitting cluster $C_k$ or merging cluster $C_k$ with another cluster within the core group of clusters. In some embodiments, the system determines 320 whether to update cluster $C_k$ using $\sigma_k$. Implementation of this determination will be discussed in detail below with respect to FIG. 4.

Figure 4:
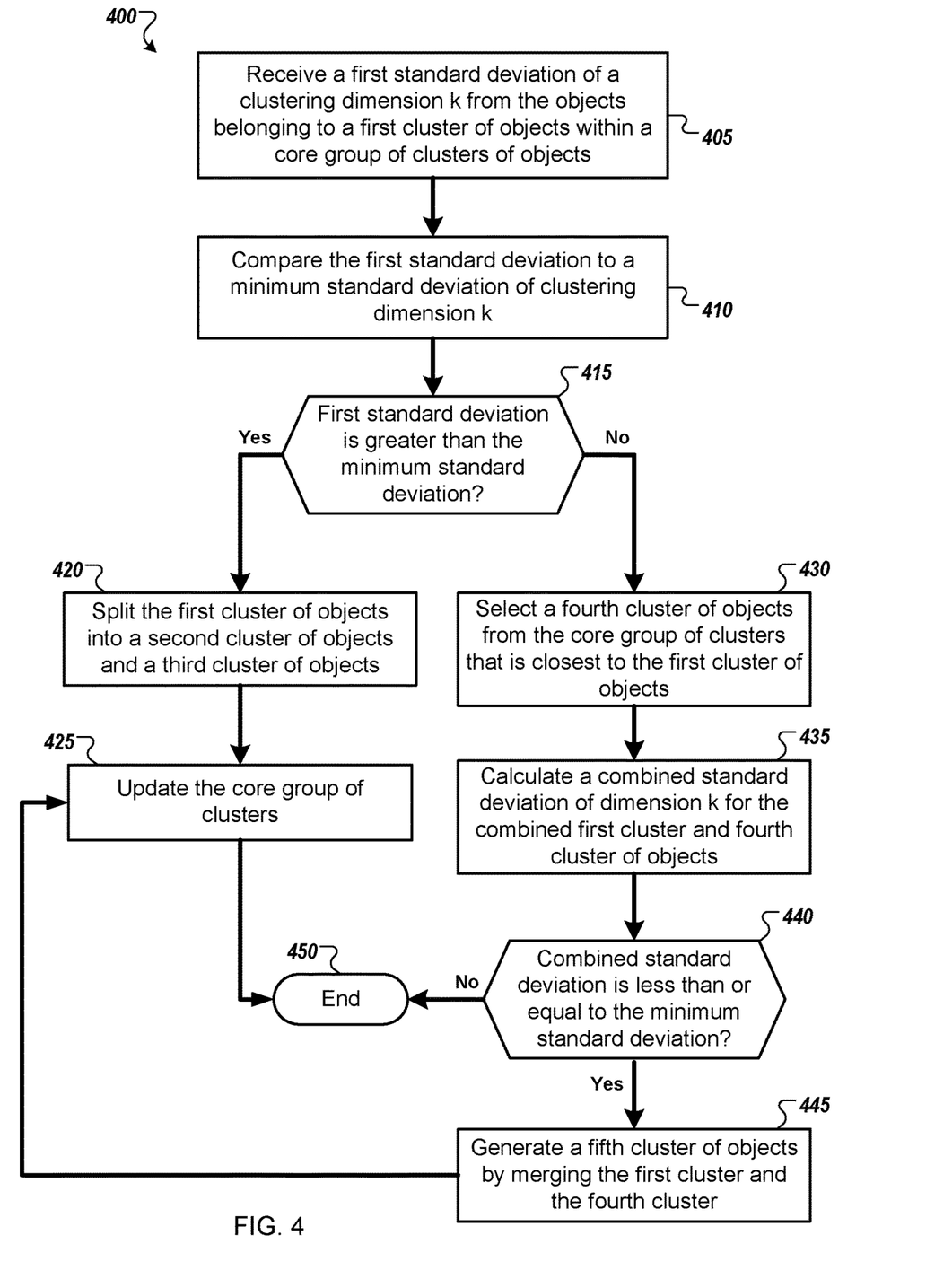
FIG. 4 is a flow diagram of an example method for determining whether to update a cluster within a model group of clusters in accordance with some embodiments discussed herein.

FIG. 4 is a flow diagram of an example method 400 for determining whether to update a cluster within a model group of clusters. For convenience, the method 400 will be described with respect to a system that includes one or more computing devices and performs the method 400. Specifically, the method 400 will be described with respect to implementation of steps 315 and 320 of method 300 by cluster group updater 120 of dynamic clustering module 100 (shown in FIG. 1).

In embodiments, the system receives 405 $\sigma_k$, a calculated standard deviation of the objects in cluster $C_k$ of a model core group of clusters. The system compares 410 $\sigma_k$ to $\Sigma_k$, a minimum standard deviation calculated for the $k^{th}$ dimension. In some embodiments, $\Sigma_k$ is calculated based on a very large stored data sample (e.g., several million instances) of dimension k data points that have been collected previously.

In an instance in which $\sigma_k > \Sigma_k$, in embodiments, the system splits $C_k$ into two new clusters. In embodiments, the system updates 425 $X_k$ by updating the properties of each of the two new clusters, adding the new clusters to $X_k$, and deleting cluster $C_k$ from $X_k$. The process ends 450 after the updating of $X_k$.

In an instance in which $\sigma_k \leq \Sigma_k$, in embodiments, the system selects 430 a cluster $C_{k'}$ from $X_k$ that is closest to cluster $C_k$. In embodiments, the system calculates a combined standard deviation $\sigma$ of the objects within clusters $C_k$ and $C_{k'}$. In embodiments, the system compares 440 $\sigma$ to $\Sigma_k$.

In an instance in which $\sigma \leq \Sigma_k$, in embodiments, the system merges clusters $C_k$ and $C_{k'}$ into a new cluster, cluster $C_{k''}$. In embodiments, the system updates 425 $X_k$ by updating the properties of cluster $C_{k''}$, adding cluster $C_{k''}$ to $X_k$, and deleting clusters $C_k$ and $C_{k'}$ from $X_k$. The process ends 450 after the updating of $X_k$.

In an instance in which $\sigma > \Sigma_k$, in embodiments, the system does not update $X_k$ and the process ends.

Figure 5:
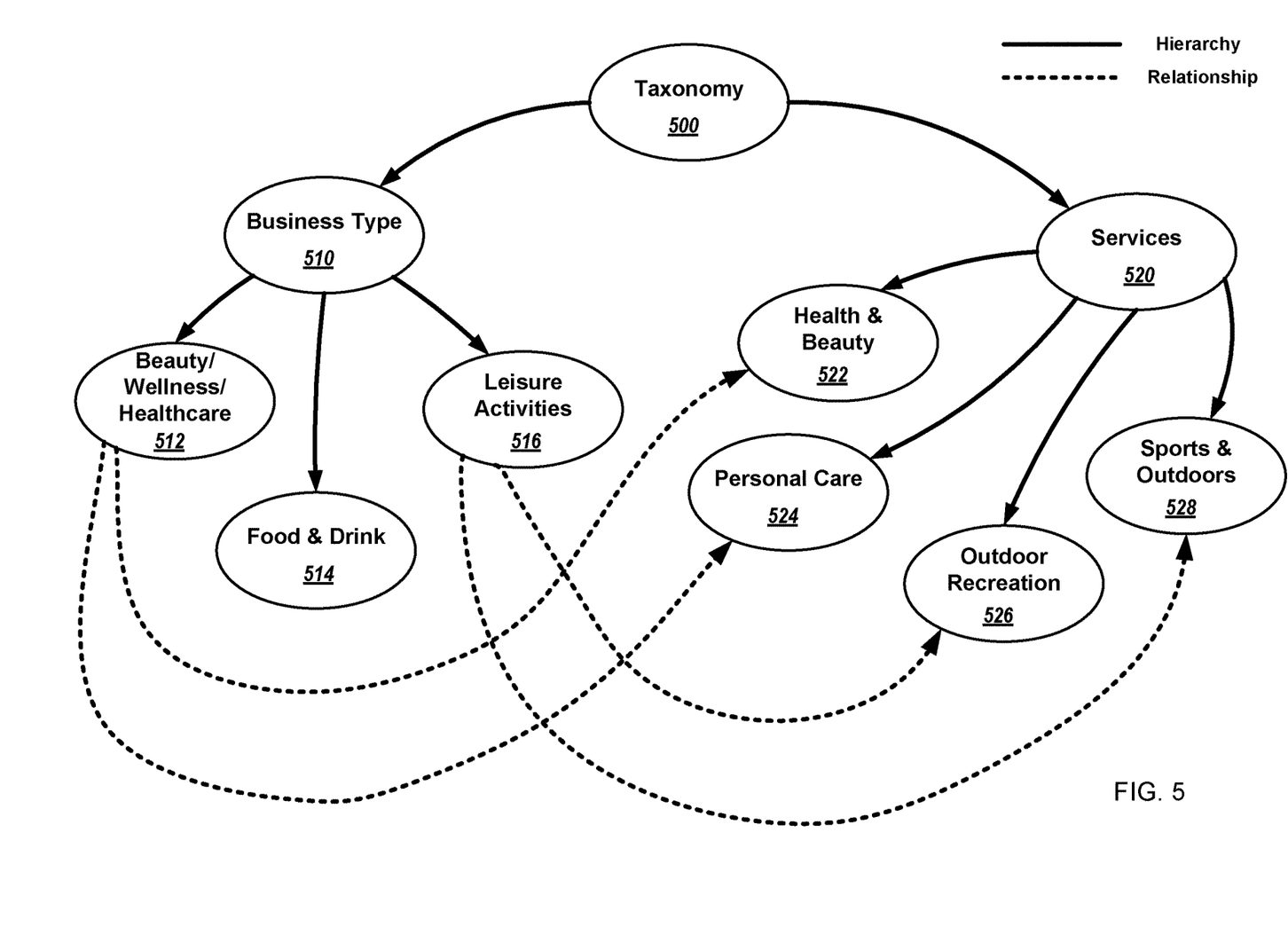
FIG. 5 illustrates an exemplary taxonomy structure that represents business categories in accordance with some embodiments discussed herein.

FIG. 5 illustrates an exemplary taxonomy structure 500 that represents business categories. Taxonomy 500 contains two primary hierarchies: Business Type 510 and Services 520. In embodiments, poor data quality can result when a data stream is derived from multiple sources that each defines its own data structures. Exemplary taxonomy 500 can be used to map categories across different sources to a uniform hierarchy for improved data quality.

In some embodiments, dynamic clustering module 100 may implement dynamic clustering in a taxonomy feature space where the top higher level categories are predetermined and the lower level hierarchies are generated using a bisection k-means algorithm as previously described.

Referring to the exemplary taxonomy structure 500, the number of business type 510 categories and services associated with a higher level category can be determined based on calculating the similarity of object features based on shared attributes (hierarchy) and relationship mappings (relationship), and this number is fixed for each category. For example, in taxonomy structure 500, the business type category 510 contains seven hierarchies. In some embodiments, the Jaro-Winkler edit distance, which is defined in Winkler, W. E., "String Comparator Metrics and Enhanced Decision Rules in the Fellegi-Sunter Model of Record Linkage," *Proceedings of the Section on Survey Research Methods* (American Statistical Association) 1990, is used as the similarity function to determine the number of hierarchies associated with each category, although the choice of similarity function is not critical to the invention.

In some embodiments, dynamic clustering module 100 may receive a stream S of data points consisting of the relevant taxonomy fields, generate the top-level hierarchies according to the top-level business types in the taxonomy structure, and, for each data point in stream S corresponding to a top-level hierarchy that falls into a particular business-type, determine the set of core clusters X by implementing methods 200, 300, and 400.

In some embodiments, in response to receiving a request for core cluster information, dynamic clustering module 100 may generate an updated hierarchical model core group of clusters X* by merging the clusters in X using one or more tuning parameters and/or supplemental information and/or a cluster purity measure, as previously described.

Figure 6:
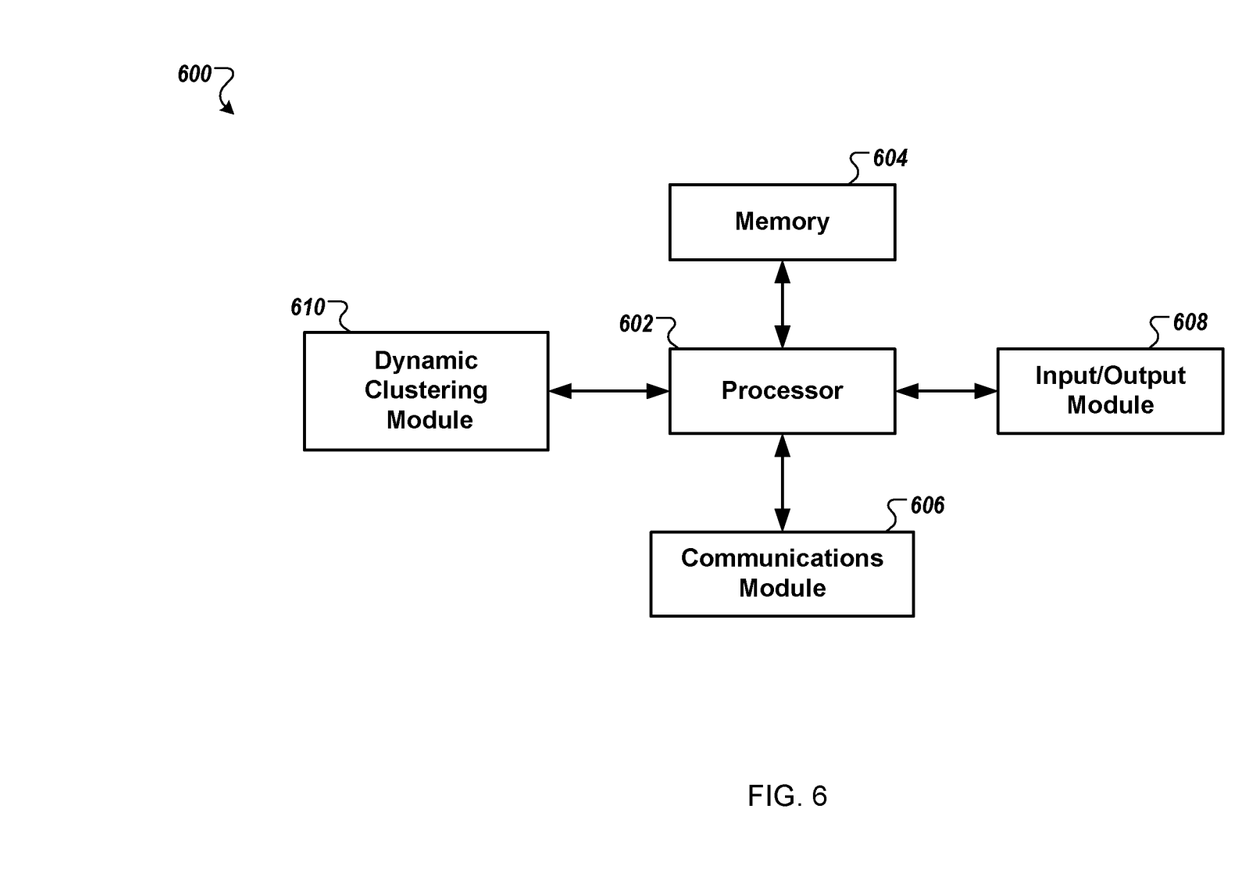
FIG. 6 illustrates a schematic block diagram of circuitry that can be included in a computing device, such as a dynamic clustering system, in accordance with some embodiments discussed herein.

FIG. 6 shows a schematic block diagram of circuitry 600, some or all of which may be included in, for example, a dynamic clustering system. As illustrated in FIG. 6, in accordance with some example embodiments, circuitry 600 can include various means, such as processor 602, memory 604, communications module 606, and/or input/output module 608. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein, such as those discussed in connection with FIGS. 2-4.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data (including analytics data), applications, instructions, or the like for enabling circuitry 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications with another computing device. Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with FIG. 1. As such, input/output module 608 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600, such as for example, pharmacy terminal 108. Input/output module 608 may be in communication with the memory 604, communications module 606, and/or any other component(s), such as via a bus. Although more than one input/output module and/or other component can be included in circuitry 600, only one is shown in FIG. 6 to avoid overcomplicating the drawing (like the other components discussed herein).

Dynamic clustering module 610 may also or instead be included and configured to perform the functionality discussed herein related to the dynamic clustering discussed above. In some embodiments, some or all of the functionality of dynamic clustering may be performed by processor 602. In this regard, the example processes and algorithms discussed herein can be performed by at least one processor 602 and/or dynamic clustering module 610. For example, non-transitory computer readable media can be configured to store firmware, one or more application programs, and/or other software, which include instructions and other computer-readable program code portions that can be executed to control each processor (e.g., processor 602 and/or dynamic clustering module 610) of the components of system 400 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 602 and/or dynamic clustering module 610 discussed above with reference to FIG. 6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising: at least one processor, and at least one memory for storing instructions that, when executed by the at least one processor, cause the apparatus to;
   for each data point of a multi-dimensional stream of data points, the multi-dimensional stream of data points representing objects of a core group of clusters of objects, each data point respectively representing an instance of a first dimension describing a feature of an object within the objects, wherein the core group of clusters of objects is generated based at least in part on a tuning parameter,
      add an object described by the data point to a first cluster of objects within the core group of clusters of objects in response to classifying the object as belonging to the first cluster of objects;
      update properties of the first cluster of objects in response to the adding the object, wherein the updating the properties of the first duster of objects comprises calculating a first standard deviation of the first duster of objects for the first dimension; and
   in response to receiving a request via a network for core duster information, determine whether to update the core group of dusters using the updated properties of the first duster of objects, wherein the determining whether to update the core group of dusters comprises
      comparing the first standard deviation to a minimum standard deviation for the first dimension; and
      updating the core group of dusters of objects based on the comparison and the tuning parameter.

2. The apparatus of claim 1, wherein each object is represented by a corresponding instance of a multi-dimensional feature vector including a first dimension.

3. The apparatus of claim 2, wherein the core group of clusters of objects is clustered based on the first dimension.

4. The apparatus of claim 1, wherein the first dimension comprises a geographical feature of an object.

5. The apparatus of claim 4, wherein the geographical feature is represented by latitude and longitude data.

6. The apparatus of claim 1, wherein the memory stores instructions that, with the at least one processor, cause the apparatus to:
   in an instance in which the first standard deviation of the first cluster of objects for the first dimension is greater than the minimum standard deviation for the first dimension, split the first cluster of objects by dividing the first cluster of objects into a second cluster of objects and a third cluster of objects.

7. The apparatus of claim 1, wherein the tuning parameter is one or more of a minimum number of data points to form a core cluster, a minimum number of neighborhood points for merging into core clusters, or a clustering density.

8. The apparatus of claim 1, wherein the first dimension is associated with a taxonomy hierarchy.

9. The apparatus of claim 1, wherein the first dimension comprises a category.

10. The apparatus of claim 9, wherein the category is associated with a taxonomy hierarchy.

11. The apparatus of claim 10, wherein the taxonomy hierarchy comprises a plurality of hierarchies.

12. The apparatus of claim 9, wherein the category comprises a business type category.

13. A computer program product comprising a non-transitory computer readable medium storing instructions that, when executed by a processor, cause an apparatus to:
   for each data point of a multi-dimensional stream of data points, the multi-dimensional stream of data points representing objects of a core group of clusters of objects, each data point respectively representing an instance of a first dimension describing a feature of an object within the objects, wherein the core group of clusters of objects is generated based at least in part on a tuning parameter,
      add an object described by the data point to a first cluster of objects within the core group of clusters of objects in response to classifying the object as belonging to the first cluster of objects;
      update properties of the first cluster of objects in response to the adding the object, wherein the updating the properties of the first duster of objects comprises calculating a first standard deviation of the first duster of objects for the first dimension; and
   in response to receiving a request via a network for core duster information, determine whether to update the core group of dusters using the updated properties of the first duster of objects, wherein the determining whether to update the core group of dusters comprises
      comparing the first standard deviation to a minimum standard deviation for the first dimension; and
      updating the core group of clusters of objects based on the comparison and the tuning parameter.

14. The computer program product of claim 13, wherein each object is represented by a corresponding instance of a multi-dimensional feature vector including a first dimension.

15. The computer program product of claim 14, wherein the core group of clusters of objects is clustered based on the first dimension.

16. The non transitory computer program product of claim 13, wherein the tuning parameter is one or more of a minimum number of data points to form a core cluster, a minimum number of neighborhood points for merging into core clusters, or a clustering density.

17. The computer program product of claim 13, wherein the first dimension is associated with a taxonomy hierarchy.

18. The computer program product of claim 13, wherein the first dimension comprises one or more of a category or a geographical feature of an object.

19. The computer program product of claim 18, wherein the geographical feature is represented by latitude and longitude data.

20. The computer program product of claim 17, wherein the category comprises a business type category.

21. The computer program product of claim 17, wherein the taxonomy hierarchy comprises a plurality of hierarchies.

22. A computer implemented method, comprising:
for each data point of a multi-dimensional stream of data points, the multi-dimensional stream of data points representing objects of a core group of clusters of objects, each data point respectively representing an instance of a first dimension describing a feature of an object within the objects, wherein the core group of clusters of objects is generated based at least in part on a tuning parameter,
adding, by a computer, an object described by the data point to a first cluster of objects within the core group of clusters of objects in response to classifying the object as belonging to the first cluster of objects;
updating, by the computer, properties of the first cluster of objects in response to the adding the object, wherein the updating the properties of the first cluster of objects comprises calculating a first standard deviation of the first cluster of objects for the first dimension; and in response to receiving a request via a network for core cluster information, determining, by the computer, whether to update the core group of clusters using the updated properties of the first cluster of objects, wherein the determining whether to update the core group of clusters comprises
comparing the first standard deviation to a minimum standard deviation for the first dimension; and
updating the core group of clusters of objects based on the comparison and the tuning parameter.

* * * * *

UNITED STATES PATENT AND TRADEMARK OFFICE
CERTIFICATE OF CORRECTION

| | | |
|---|---|---|
| PATENT NO. | : 11,016,996 B2 | Page 1 of 1 |
| APPLICATION NO. | : 16/418267 | |
| DATED | : May 25, 2021 | |
| INVENTOR(S) | : DeLand et al. | |

It is certified that error appears in the above-identified patent and that said Letters Patent is hereby corrected as shown below:

In the Claims

Column 11,
Line 31, "to;" should read --to:--;
Lines 46, 48, 50, and 52, at each instance, "duster" should read --cluster--;
Lines 51, 53, and 57, at each instance, "dusters" should read --clusters--.

Column 12,
Lines 43, 45, 47, and 49, at each instance, "duster" should read --cluster--;
Lines 48 and 50, at each instance, "dusters" should read --clusters--;
Line 61, "non transitory computer program product" should read --computer program product--.

Column 13,
Line 7, "claim 17" should read --claim 18--.

Signed and Sealed this
Twenty-third Day of August, 2022

Katherine Kelly Vidal
*Director of the United States Patent and Trademark Office*